(12) United States Patent
Couderc

(10) Patent No.: US 11,441,591 B2
(45) Date of Patent: Sep. 13, 2022

(54) PIN WITH BREAKNECK GROOVE, FASTENER COMPRISING SUCH A PIN, RELATED ASSEMBLY AND INSTALLATION METHOD

(71) Applicant: LISI AEROSPACE, Paris (FR)

(72) Inventor: Jérôme Couderc, Lafouillade (FR)

(73) Assignee: LISI AEROSPACE, Paris (FR)

( * ) Notice: Subject to any disclaimer, the term of this patent is extended or adjusted under 35 U.S.C. 154(b) by 287 days.

(21) Appl. No.: 16/558,132

(22) Filed: Sep. 1, 2019

(65) Prior Publication Data
US 2020/0072271 A1 Mar. 5, 2020

(30) Foreign Application Priority Data
Sep. 4, 2018 (FR) .................................... 1857929

(51) Int. Cl.
*F16B 19/10* (2006.01)
*F16B 5/04* (2006.01)

(52) U.S. Cl.
CPC ...... *F16B 19/1054* (2013.01); *F16B 19/1072* (2013.01); *F16B 5/04* (2013.01); *F16B 19/10* (2013.01)

(58) Field of Classification Search
CPC ...... F16B 5/04; F16B 13/061; F16B 19/1054; F16B 19/1072; F16B 31/00; F16B 37/067; F16B 19/10; E21D 21/008
USPC .................................................... 411/39, 43
See application file for complete search history.

(56) References Cited

U.S. PATENT DOCUMENTS

| 4,221,152 | A  | * | 9/1980  | Jason ...................... F16B 19/05 411/360 |
| 5,135,340 | A  | * | 8/1992  | Stinson ............... F16B 19/1045 411/183 |
| 6,233,802 | B1 | * | 5/2001  | Fulbright ................ F16B 19/05 29/243.519 |
| 6,665,922 | B2 | * | 12/2003 | Schultz .................. B21J 15/022 29/525.02 |
| 7,566,195 | B2 | * | 7/2009  | Hull ..................... F16B 19/1054 411/38 |
| 8,573,910 | B2 | * | 11/2013 | March ....................... F16B 5/02 411/43 |
| 9,669,457 | B2 | * | 6/2017  | Bigot ..................... B21J 15/043 |
| 10,118,280 | B2 |   | 11/2018 | Bigot |

(Continued)

FOREIGN PATENT DOCUMENTS

| EP | 2042250 | 4/2009 |
| FR | 3016417 | 1/2014 |

(Continued)

*Primary Examiner* — Roberta S Delisle
(74) *Attorney, Agent, or Firm* — Henricks Slavin LLP

(57) ABSTRACT

This invention relates to a pin comprising a head (22) and a threaded portion, an end of the head forming an end surface (32) on a first plane perpendicular to the main axis.
The pin further comprises a handling component (30) which is an integral part of the head, a junction (50) between that head and the handling component comprising a breakneck groove (52) with a rotational shape.
A section of the breakneck groove has an arc of circle portion (60), a center (68) of that circle primarily in the first plane, so that a plane containing the breakneck groove (52) surface clearly coincides with the first plane.

12 Claims, 4 Drawing Sheets

(56) References Cited

U.S. PATENT DOCUMENTS

| | | | |
|---|---|---|---|
| 2010/0260572 A1* | 10/2010 | Wehrmeister | F16B 4/004 |
| | | | 411/43 |
| 2015/0010370 A1* | 1/2015 | Pratt | F16B 19/1063 |
| | | | 411/43 |
| 2015/0196951 A1 | 7/2015 | Bigot et al. | |
| 2016/0215804 A1* | 7/2016 | Hufnagl | F16B 19/1054 |
| 2019/0186522 A1 | 6/2019 | Pailhories et al. | |

FOREIGN PATENT DOCUMENTS

| | | |
|---|---|---|
| FR | 3053745 | 1/2018 |
| WO | WO 2004/104429 | 12/2004 |
| WO | WO 2007/100906 | 9/2007 |
| WO | WO 2013/043673 | 3/2013 |
| WO | WO 2014/074862 | 5/2014 |
| WO | WO 2014/187821 | 11/2014 |
| WO | WO 2016/118694 | 7/2016 |

\* cited by examiner

PIN WITH BREAKNECK GROOVE, FASTENER COMPRISING SUCH A PIN, RELATED ASSEMBLY AND INSTALLATION METHOD

CROSS REFERENCE TO RELATED APPLICATIONS

This application is a National Application of FR1857929, filed Sep. 4, 2018, the entire contents of which is incorporated herein by reference.

This invention involves a pin extending along a main axis consisting of a head and a threaded portion, a head end opposite the threaded portion forming an end surface set in an initial plane perpendicular to the main axis. The pin also comprises a handling component which is an integral part of the head opposite the threaded portion, a junction between the head and that handling component consisting of a breakneck groove configured to break under a torsional stress greater than a predetermined threshold, said breakneck groove having substantially a shape of revolution around the main axis.

The invention particularly applies to blind fasteners comprising this type of pin, i.e. fasteners installed through a single side of structures, commonly known as the "accessible" side. These fasteners are, for example, used in the assembly of aircraft structures.

Blind fasteners using this type of pins, as well as the related installation methods, are described in particular in the documents FR3016417 and FR3053745 in the name of the Applicant.

The pin's handling component allows to grasp the fastener, then to install it in a structure using a pulling then rotation movement, or a single rotation movement. When the installed configuration is achieved, continuing the rotational movement causes the pin to break between the handling component and the head. The head is flush with an external surface when installed in a countersink or sleeve of the structure.

In the aeronautical field, the surfaces are preferably free of roughness for aerodynamic reasons. It is therefore preferable that the handling component breakage lead to a pin head with the smoothest possible surface. Otherwise, the pin has a break point in the form of an outward protrusion, or hollow indentation.

A break point in the form of a protrusion requires a subsequent step. The installation of the pin must either be followed by a shaving step which generates additional costs and installation time, as described in EP 2 042 250 B1. A break point in the form of an indentation generates aeronautical streaks.

This invention aims to solve that problem by configuring the pin so as to optimize the breakneck groove geometry.

For this purpose, the invention involves a pin of the aforementioned type, in which, in a second plane comprising the main axis, a section of the breakneck groove has an arc of circle portion, a center of that circle in the first plane, so that a plane containing the breakneck groove surface substantially coincides with the first plane.

According to other advantageous aspects of the invention, the pin comprises one or more of the following feature(s), taken individually or according to all the possible technical combinations:

The breakneck groove arc of circle portion consists of a first and a second part, arranged on the head and handling component on either side of the first plane respectively, with the first part forming a cavity in the head in relation to the first end surface;

The breakneck groove has a first and second lip tangential to the arc of circle portion and substantially frustoconical, said lips being arranged on the head and handling component respectively;

The first lip forms a first angle with the end surface of the head, and a second angle with the second lip; the first angle is between 5° and 25°, and preferably between 10° and 15°; and the second angle is between 15° and 60°, preferably between 25° and 35° and much more preferably close to 30°.

The head of the pin is a countersunk head;

The pin further comprises a shaft positioned between the head and the threaded portion, said shaft comprising preferably a first and second cylindrical portion connected by a shoulder, the first portion being adjacent to the head and having a first diameter, the second portion being adjacent to the threaded portion and having a second diameter smaller than the first diameter.

The invention also relies on a fastener comprising a pin as described above and a sleeve comprising a collar and a substantially cylindrical body, adjacent along the main axis. The body of the sleeve consists of: a deformation zone able to form an external bulb; and a threaded portion that can interact with the thread of the pin.

According to an advantageous aspect of the invention, the collar of the sleeve is frustoconical and can house the pin's countersunk head, an end of that collar, opposite the body of the sleeve, being substantially lying in a third plane perpendicular to the main axis.

The invention further relates to an assembly comprising: at least one structure comprising a first and a second opposite side and a hole opening on each of those surfaces; and a fastener as described above. The sleeve collar is in contact with the head of the pin and butts up against the end of the hole in the structure; the sleeve body's deformation zone is in an installed configuration, in the form of an external bulb in contact with the second surface of the structure; and the pin head and handling component are separated, said head having a substantially coplanar fracture surface with the end surface of the pin and end of the sleeve collar.

According to an advantageous aspect of the invention, the fracture surface is bordered by the breakneck groove's first part of the arc of circle portion.

The invention further relates to a method of installing a fastener as described above in a structure comprising a first and a second opposite side and a hole opening on each of those surfaces, said method comprising the following successive steps: assembling the threaded portion of the pin with the threaded portion of the sleeve, as the deformation zone of the sleeve body is initially in a cylindrical configuration; inserting the sleeve into the hole in the first surface of the structure; keeping the collar in contact with the first surface; pulling or torquing the pin into the sleeve until an outer bulb is formed in contact with the second surface; and torquing the handling component with respect to the pin head around the main axis until the breakneck groove breaks and the fracture surface forms on the head.

The invention will be better understood upon reading the following description, which is provided solely by way of a non-limiting example, and with reference to the drawings, in which.

Figure 1:
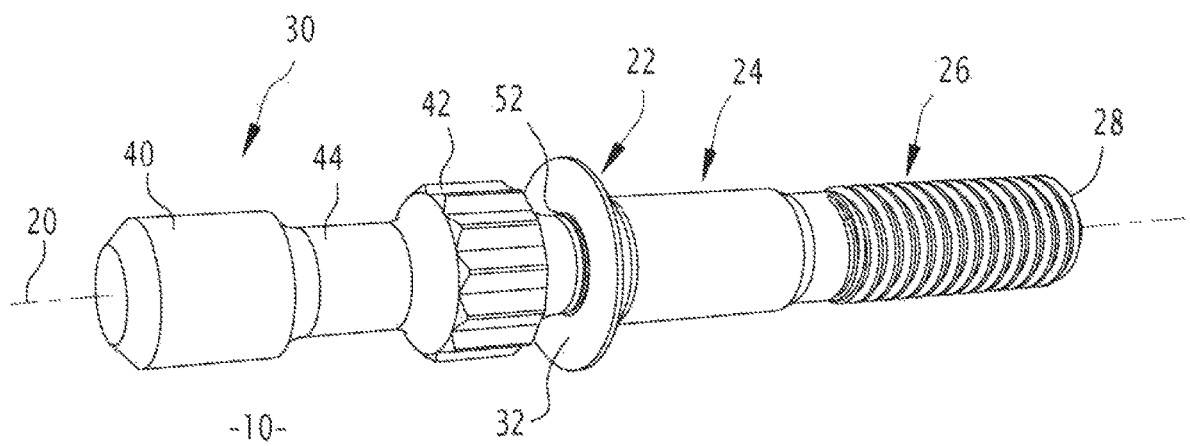
FIG. 1 is a view in perspective of a pin according to one embodiment of the invention, in an initial configuration.
Figure 3:
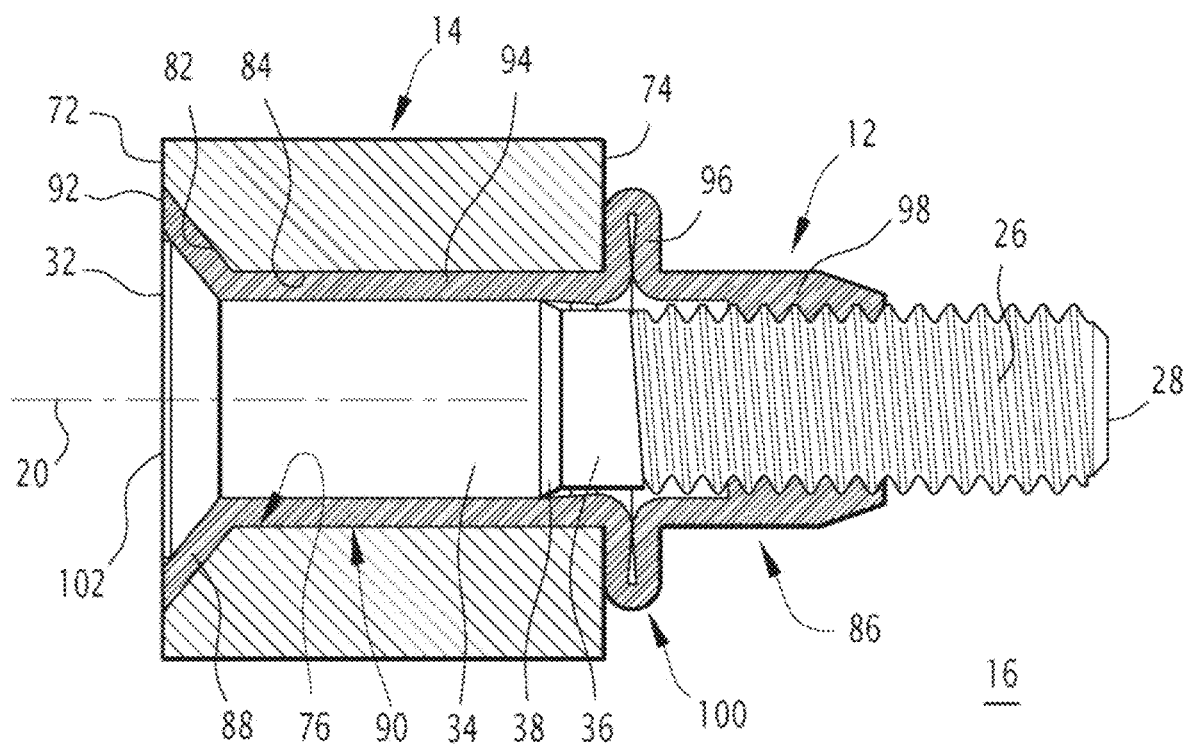
FIG. 3 is a partial section of an assembly comprising a fastener as per an embodiment of the invention, said fastener comprising the pin of FIG. 1 in an installed configuration.

FIG. 1 shows a pin 10 in a first configuration called initial configuration. Pin 10 is intended to be part of a fastener 12, able to be fitted to a structure 14 to form an assembly 16. The fastener 12 and assembly 16, in which the pin 10 is in the second configuration called the installed configuration, are represented in FIG. 3.

The pin 10 extends along a main axis 20 and comprises a head 22, a shaft 24 and a threaded portion 26, adjacent to the main axis. A first end 28 of the pin 10, along the main axis 20, is formed by a free end of the threaded portion 26.

The pin 10 further comprises a handling component 30. In the initial configuration of FIG. 1, the handling component 30 is adjacent to the head 22 and forms a second end of the pin 10 along the main axis 20.

Preferably, the pin 10 is made of metal, e.g. A286 type stainless steel, or titanium alloy.

A first end of the head 22 forms an end surface 32 on a plane perpendicular to the main axis 20. More specifically, the end surface 32 is a circular crown in shape.

Preferably, as in the embodiment shown, the head 22 is a countersunk head. More specifically, the head 22 is frustoconical, the end surface 32 representing the flared end of the frustum. In a variant not shown, the head of the pin is a protruding head.

A second end of the head 22 is an integral part of the shaft 24. In the embodiment shown, the shaft 24 comprises a first portion 34 and second portion 36, connected by a shoulder 38. Both portions 34 and 36 have a substantially cylindrical shape of revolution, arranged along the main axis 20. The first portion 34, adjacent to the head 22, has a diameter greater than that of the second portion 36 adjacent to the threaded portion 26. The shaft 24, in particular, is similar to the pin shaft described in document FR3053745.

According to a variant not shown, the pin shaft is cylindrical with a constant diameter between the head 22 and the threaded portion 26.

The handling component 30 of the pin 10 can interact with a setting tool for an automated installation of the fastener rivet 12. The handling component 30, for example, comprises a first handling portion 40 and a second handling portion 42 connected by a locking portion 44. The first 40 and second 42 handling portions and the locking portion 44 are intended to respectively guide the insertion of the fastener 12 into a setting tool, transfer torsion torque and limit any axial movement of the fastener in the setting tool. A fastener comprising this type of handling component, as well as combining well with a setting tool, are described in document FR 3016417.

Figure 2:
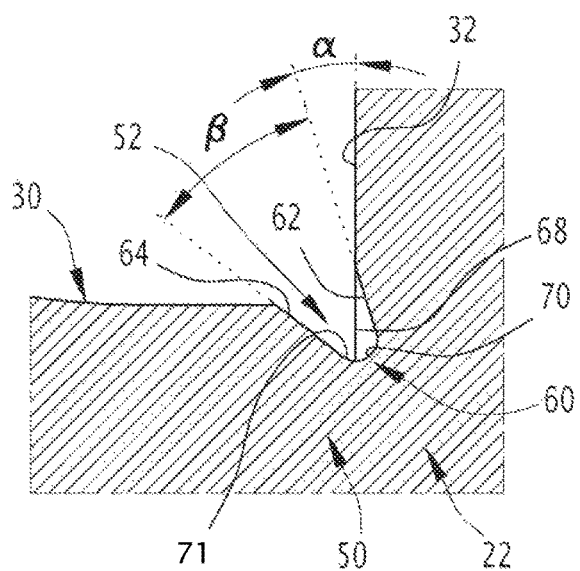
FIG. 2 is a partial, detailed cross-sectional view of the pin shown in FIG. 1.

In the initial configuration of FIG. 1, the handling component 30 is connected to the head 22 by a junction 50 (FIG. 2). This junction 50 has the weakest section of the handling component 30, along the main axis 20, and preferably of the pin 10. The junction 50, in particular, includes a breakneck groove 52 configured so as to withstand a certain amount of tensile stress along the main axis 20, and to yield beyond a certain torsional stress threshold around that axis.

The breakneck groove 52 is a shape of revolution around the main axis 20. FIG. 2 shows a detailed view of the pin 10 at the junction 50, as the breakneck groove 52 is represented in partial section on a sectional drawing comprising the main axis 20.

The breakneck groove 52 has a curved central portion 60, extended by a first lip 62 and a second lip 64. Said lips 62 and 64 are located on either side of the central portion 60, on the head 22 and handling component 30 respectively. Both lips 62 and 64 are substantially frustoconical in shape. A free edge 66 of the first lip 62 forms an inner edge of the circular-shaped crown end surface 32 of the head 22.

In the sectional drawing of FIG. 2, the central portion 60 has a section shaped as an arc of circle, the generators of the first lip 62 and second lip 64 being tangent to said circle. A center 68 of the circle is substantially disposed in the plane of the end surface 32 of the head 22.

The central portion 60 thus has a first part 70 and a second part 71, located on either side of the plane of the end surface 32. The first part 70, as well as the first lip 62, form a bas-relief in the head 22 with respect to the end surface 32.

In the sectional drawing of FIG. 2, the first lip 62 forms a first angle α with the end surface 32 of the head 22, and a second angle β with the second lip 64.

Preferably, the first angle α is between 5° and 20° and more preferably between 10° and 15°.

Preferably, the second angle β is between 15° and 60° and more preferably between 25° and 35°. Much more preferably the angle β is close to 35°.

The assembly 16 of FIG. 3, comprising the structure 14 and fastener 12 in the installed configuration, will now be described.

The structure 14 is preferably formed of several stacked components, secured by the fastener 12. Only one component is shown in FIG. 3.

The structure 14 comprises a first surface 72 and a second surface 74, both flat, opposite and parallel. The first surface 72 is accessible to an operator. The second surface 74 may not be accessible.

The structure 14 also comprises a hole 76 opening to each of the surfaces 72 and 74. The hole 76 is substantially perpendicular to the surfaces 72 and 74 of the structure 14.

The hole 76 comprises a countersunk surface 82, adjacent to the front surface 72, and a cylindrical surface 84, adjacent to the countersink surface and extending as far as the second surface 74. The countersink surface 82 has a substantially truncated cone shape.

The fastener 12 comprises the previously described pin 10, as well as a sleeve 86. Said sleeve is preferably metallic as is the pin 10.

The sleeve 86 comprises a flared collar 88 and a tubular body 90, adjacent to each other. A free end 92 of the collar 88 forms a substantially flat circular crown surface.

The body 90 comprises: a clamping zone 94 able to house the pin's shaft 24, a deformation zone 96 adjacent to the clamping zone; and a threaded portion 98 adjacent to the deformation zone and capable of interacting with the threaded portion 26 of the pin 10. In an initial configuration of the fastener 12, not shown, the body 90 of the sleeve 86 is cylindrical along its entire length. A fastener similar to the fastener 12 is described in the document FR3053745.

In the installed configuration shown in FIG. 3, the sleeve 86 is inserted in the hole 76 of the structure 14 and the pin 10 is inserted in the sleeve. The collar 88 of the sleeve is fitted to the countersink surface 82 of the hole 76 and houses the head 22 of the pin 10. The first surface 72 of the structure 14, the free end 92 of the sleeve 86 and the end surface 32 of the pin 10 are substantially coplanar.

In addition, the deformation zone 96 of the body 90 forms a bulb 100 in contact with the second surface 74 of the structure 14.

Finally, the handling component 30 is separated from the head 22 of the pin 10. The handling component 30 is not shown in FIG. 3.

Figure 4:
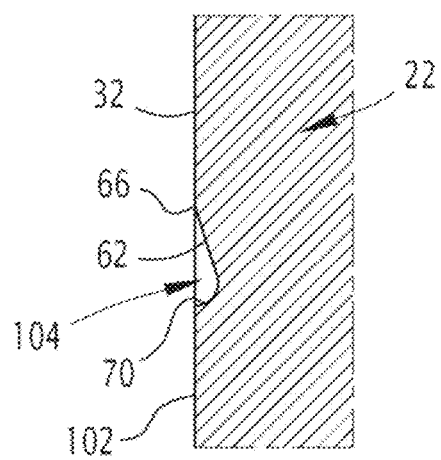
FIG. 4 is a partial, detailed cross-sectional view of FIG. 3.
Figure 5:
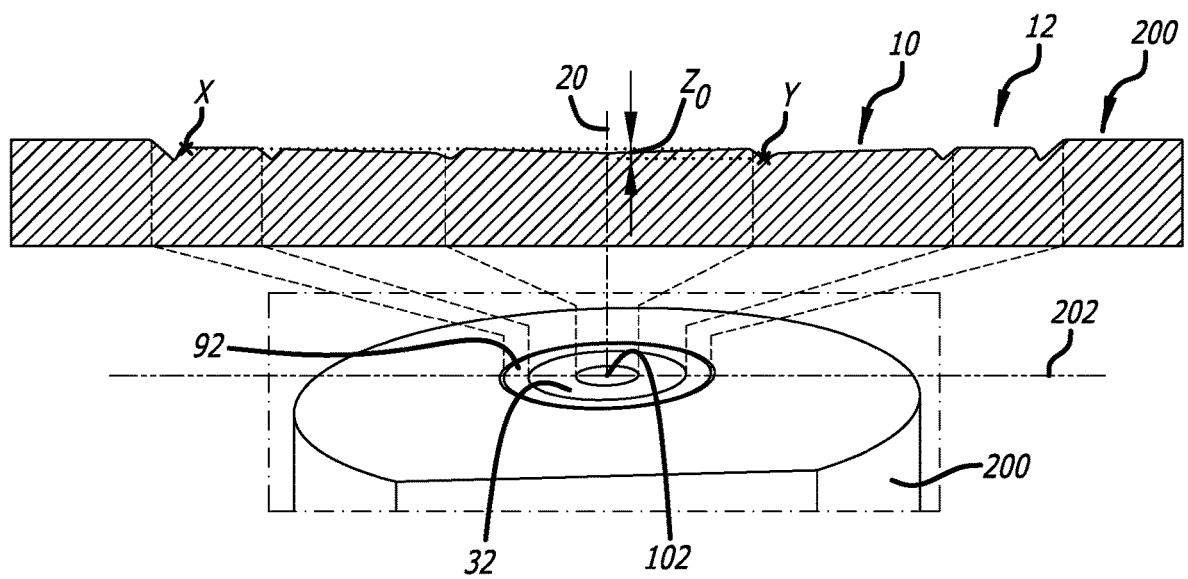
FIG. 5 is a photograph of an assembly comprising a fastener as per an embodiment of the invention, said fastener comprising the pin in FIG. 1 in an installed configuration, photograph associated with a partial section of the fastener head.

In the installed configuration, the head 22 therefore has a fracture surface 102 instead of the junction 50 of the initial configuration. As can be seen in FIG. 4 or 5, the rupture surface 102 is bordered by a substantially circular groove 104 formed by the first part 70 of the central portion 60 of the breakneck groove 52 as well as by the first lip 62.

The fracture surface 102 is substantially coplanar with the end surface 32, so as to obtain the smoothest surface possible at the head 22 of the pin 10.

As the center 68 of the central portion 60 is in the plane of the end surface 32, the smallest section of the junction 50 is thus in that plane. Such configuration conditions the fracture geometry of said junction during the installation of the assembly 16. A method of implementing the installation is described below:

Firstly, the pin 10 and the sleeve 86 are assembled to form the fastener 12. More specifically, the first end 28 of the pin 10 is inserted into the sleeve 86, at the collar 88; then the pin's threaded portion 26 is screwed into the sleeve's threaded portion 98 until the pin head 22 butts up against the collar 88, having a complementary truncated cone shape. The fastener 12 is thus formed, in an initial configuration not shown.

The following steps are performed, for example, using a setting tool engaged with the handling component 30 of the pin 10, in a similar way to the method described in documents FR3016617 and FR3053745.

The fastener 12 in the initial configuration is inserted in the hole 76 from the first surface 72 of the structure 14 until the collar 88 of the sleeve 86 butts up against the countersunk surface 82 of that hole. The first surface 72 of the structure 14 and the free end 92 of the sleeve 86 are then substantially coplanar. The sleeve's threaded portion 98 and deformation zone 96, as well as the pin's threaded portion 26 form a protrusion outside the structure 14, on the second surface 74.

The sleeve 86 is then held in place in the hole 76, for example by exerting an axial thrust against the free end 92 of the collar 88. Simultaneously, an axial pulling force is exerted on the pin 10, so as to bring the structure 14 closer to the pin's first end 28. The threaded portion 98 of the sleeve is driven by the displacement of said first end 28, which induces a plastic deformation of the deformation zone 96. That plastic deformation results in the outer bulge 100 formed against the structure's second surface 74.

The collar 88 and countersunk surface 82, on the one hand, and the external bulb 100 and second surface 74, on the other hand, form opposite stops that axially lock the rivet 12 in the hole 76 of the structure 14.

Then, the setting tool exerts torque on the handling component 30, around the main axis 20. The threaded portion 26 of the pin 10 is screwed into the threaded portion 98 of the sleeve 86, until the head 22 butts up against the collar 88. The end surface 32 of that head is then substantially coplanar with the free end 92 of the sleeve 86 and the first surface 72 of the structure 14.

The torque is maintained at the handling component 30 until the breakneck groove 52 reaches a torsional fracture threshold. The pin 10 then breaks at the junction 50, so as to separate the handling component 30 and the head 22.

Instead of the junction 50, a fracture surface 102 is formed on the pin head 22. Given the previously described configuration of the breakneck groove 52, the fracture surface 102, representing the smallest diameter of the handling component 30, is in the same plane as the end surface 32. "Substantially" means that the fracture surface 102 is offset axially by 15 microns at most from the plane containing the end surface 32, plus or minus the uncertainty of the measuring equipment, for example a micrometer.

The assembly 16 is then in the installed configuration, shown in FIG. 3 without the handling component 30. The head 22 of the pin 10, in the plane of the first surface 72 of the structure 14, has a surface 32, 102 substantially flat and smooth, with the exception of the circular groove 104.

Thus, the assembly 16 has an optimal surface state at the first surface 72 of the structure 14.

The Applicant has carried out installation tests of fasteners 12 in coupons 200 representative of a structure 14. The fastener 12 is in the installed configuration, as shown in FIG. 5, and the main axis 20 is considered to be vertical. The lowest points Y and the highest X of the end surface 32 are determined along a first horizontal line 202 running through the main axis 20. A first height $Z_{0°}$ is calculated between the highest point X and the lowest point Y. A second similar measurement of height $Z_{90°}$ is then performed on a second horizontal line running through the main axis 20, off set by 90° with respect to the first straight line. Flatness is the difference of the two heights $Z_{0°}$ and $Z_{90°}$ measured for each fastener. Flatness results are given in Table 1 below:

TABLE 1

| Diameter (mm) | Fastener # | Height (mm) | | | Average flatness (mm) |
|---|---|---|---|---|---|
| | | $Z_{0°}$ | $Z_{90°}$ | Flatness (mm) | |
| 8 | 1 | 0.191 | 0.198 | 0.007 | 0.005 |
| | 2 | 0.219 | 0.203 | 0.016 | |
| | 3 | 0.218 | 0.206 | 0.012 | |
| | 4 | 0.194 | 0.196 | 0.002 | |
| | 5 | 0.178 | 0.201 | 0.023 | |
| | 6 | 0.183 | 0.187 | 0.004 | |
| | 7 | 0.184 | 0.203 | 0.019 | |
| 6 | 1 | 0.132 | 0.152 | 0.010 | 0.014 |
| | 2 | 0.151 | 0.119 | 0.032 | |
| | 3 | 0.111 | 0.139 | 0.028 | |
| | 4 | 0.075 | 0.063 | 0.012 | |
| | 5 | 0.112 | 0.103 | 0.009 | |
| | 6 | 0.086 | 0.094 | 0.008 | |
| | 7 | 0.092 | 0.094 | 0.002 | |

The average flatness is around 5 to 15 microns, which indicates a very slim break in a plane. This flatness is made possible by the arc of circle section of the breakneck groove.

The Applicant has also measured the height difference between the structure and the sleeve, then the structure and the pin in order to determine the flushness.

To do this, eighteen fasteners were installed in coupons with as many countersink holes as countersunk-head fasteners. Taking into account the first surface 72 of the structure as a point of reference, the differences in the plane height between the structure and the end surface 92 of the sleeve collar, the structure and the end surface 32 of the pin's head, as well as the structure and the fracture surface 102, at a minimum point and a maximum point, were measured.

The maximum gap between the planes containing the end surface 92 of the sleeve collar, the end surface 32 of the pin head, and the break surface 102 was calculated for each installed fastener. The values used to calculate this maximum difference are shown in bold in Table 2 below:

TABLE 2

| Test # | Structure/ Sleeve (mm) | Structure/ Pin head (mm) | Structure/Fracture surface (mm) | | Plane height max. difference (mm) | Max. average difference (mm) |
|---|---|---|---|---|---|---|
| | | | Min | Max | | |
| 1 | −0.111 | −0.070 | −0.166 | −0.096 | 0.07 | −0.10 |
| 2 | −0.10 | −0.05 | −0.19 | −0.04 | −0.14 | |
| 3 | −0.09 | −0.06 | −0.17 | −0.02 | −0.11 | |
| 4 | −0.061 | 0.018 | −0.083 | 0.061 | −0.10 | |
| 5 | −0.086 | −0.050 | −0.151 | −0.149 | −0.10 | |
| 6 | −0.096 | −0.087 | −0.194 | −0.120 | −0.11 | |
| 7 | −0.125 | −0.061 | −0.222 | −0.126 | −0.16 | |
| 8 | −0.114 | −0.085 | −0.168 | −0.119 | −0.08 | |
| 9 | −0.055 | −0.023 | −0.125 | −0.054 | −0.10 | |
| 10 | −0.065 | −0.046 | −0.166 | −0.060 | −0.12 | |
| 11 | −0.02 | −0.03 | −0.16 | −0.03 | −0.13 | −0.10 |
| 12 | −0.03 | −0.04 | −0.11 | −0.06 | −0.08 | |
| 13 | −0.04 | 0.00 | −0.13 | 0.02 | −0.13 | |
| 14 | −0.04 | −0.04 | −0.11 | −0.05 | −0.07 | |
| 15 | −0.05 | −0.02 | −0.14 | −0.06 | −0.12 | |
| 16 | −0.04 | −0.01 | −0.09 | −0.05 | −0.09 | |
| 17 | −0.03 | −0.03 | −0.13 | −0.06 | −0.10 | |
| 18 | −0.03 | −0.03 | −0.15 | −0.08 | −0.12 | |

As the difference in height between the structure and the sleeve depends on the quality and/or size of the countersinking, the results show that if the sleeve's end surface 92 is strictly flush with the structure's first surface 72, the fracture surface 102 is coplanar with the end surface 32 and the sleeve's end surface in a range of between 7 and 16 µm, with an average of 10 µm. The coplanarity between the fracture surface 102 and the end surface 32 varies by the same range. This excellent coplanarity is due to the position of the center of the circle of the radiated portion of the breakneck groove 52 in a plane that is coplanar with the plane of the pin head's end surface 32.

Figure 6:
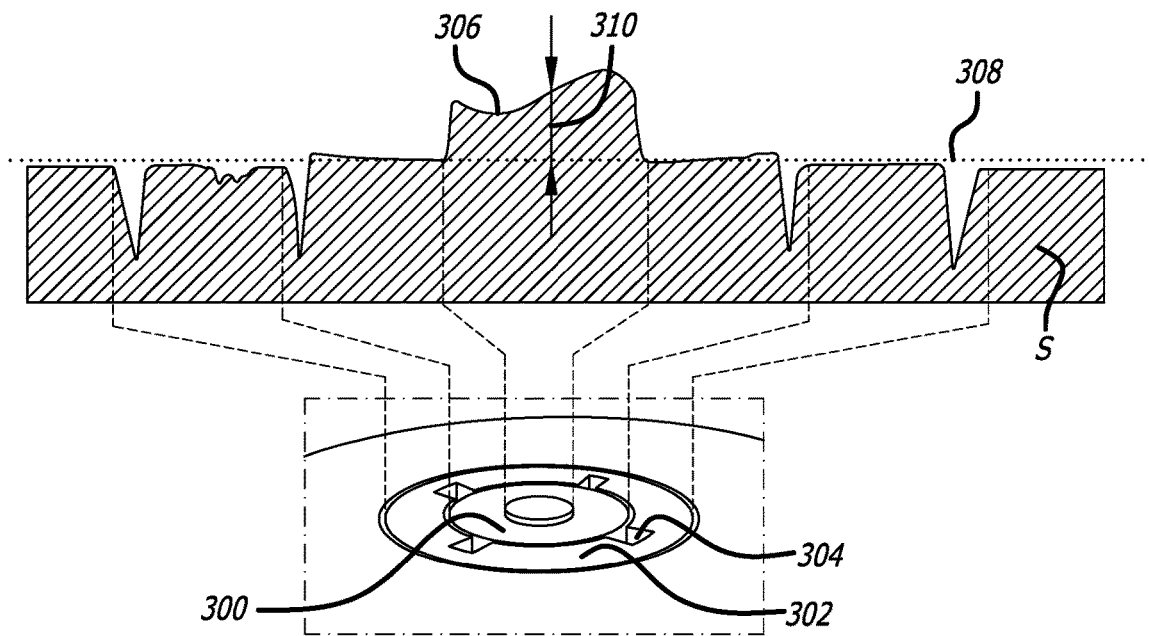
FIG. 6 is a photograph of an assembly comprising a prior art fastener in an installed configuration, photograph which is associated with a partial section of the fastener head.

The Applicant has carried out a series of tests on fasteners of the prior art described in the patent application WO2007/100906. This type of fastener comprises a pin having a head 300 and a threaded portion, a handling component secured to the head opposite the threaded portion, and the pin is configured to break under a torsional stress greater than a predetermined threshold. The fastener comprises a sleeve 302 including hollows 304 to hold the sleeve stationary while the pin is rotated. This type of fastener in the installed configuration is represented in FIG. 6 and FIG. 7.

The pin comprises a protrusion 306 facing outward from the structure S, of a height 310 varying between 0.131 mm and 0.279 mm above the pin head's end surface 308. This fastener thus has poor flatness, since the plane comprising the failure surface is 148 µm thick.

Figure 7:
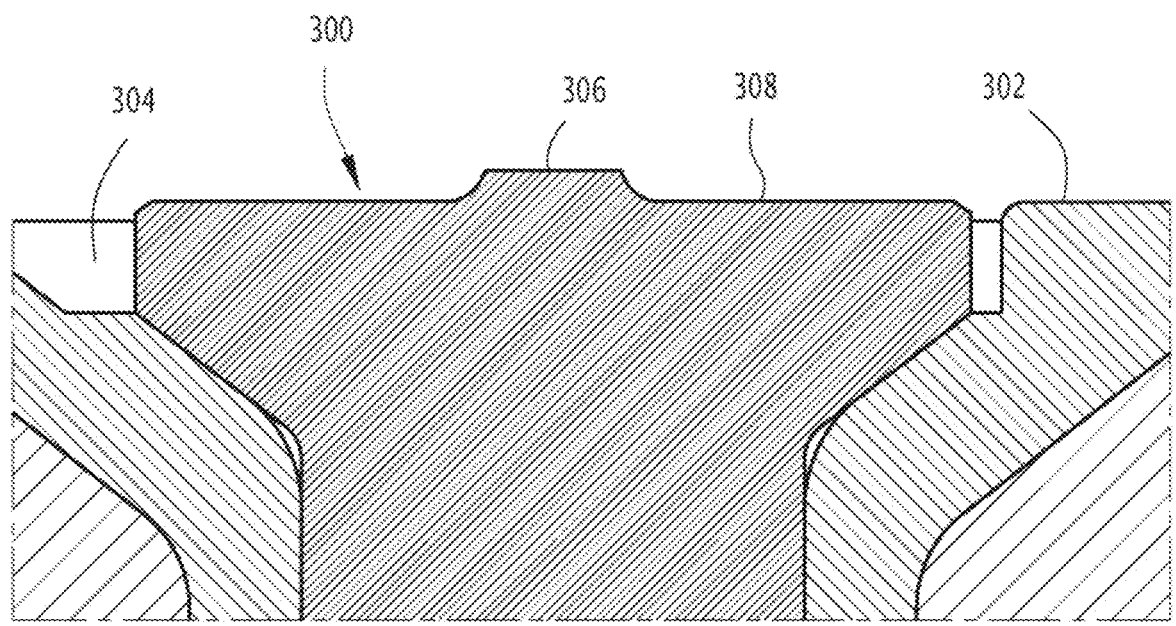
FIG. 7 is a partial section of a fastener head of FIG. 6 in an installed configuration.

A binocular cross-section shown in FIG. 7 shows that the pin does not have a breakneck groove between the pin head 300 and the handling component, so that the component breaks in a plane well above the plane containing the end surface of the pin head, since the maximum gap between the plane containing the fracture surface and the end surface of the pin head is 279 µm.

Of course, the invention is not limited to just the example described. The invention could be used to form a fastener installed by simply applying torque to the handling component, for example a fastener described in the patent application WO 2004/104429, or WO2016/118694, or WO2007/100906, or WO2014/074862, or WO2013043673. The handling component may also be a different shape than that described above, as long as the shape allows torque to be applied. This may be a simple cylinder driven by a fitted nose comprising a roller cage for example, as described in the application WO2014/187821.

In addition, as indicated above, the invention also applies to the case where the pin head protrudes. In a fastener comprising this type of pin, the sleeve's free end and the pin's end surface are not coplanar but the end surface is advantageously flat and without snags.

The invention claimed is:

1. A pin extends along a main axis and comprising a head and a threaded portion, an end of the head opposite to the threaded portion forming an end surface in a first plane perpendicular to the main axis,
   the pin further comprises a handling component which is an integral part of the head opposite the threaded portion, a junction between that head and the handling component comprising a breakneck groove configured to break under a torsional stress greater than a predetermined threshold, said breakneck groove having substantially a shape of revolution around the main axis,
   characterized in that, in a second plane comprising the main axis, a section of the breakneck groove has an arc of circle portion, a center of said circle being substantially set in the first plane, so that a plane containing a breakneck groove surface substantially coincides with the first plane.

2. Pin according to claim 1, wherein the arc of circle portion of the breakneck groove comprises a first part and a second part arranged on the first plane on either side of the head and handling component respectively,
   said first part forming a cavity in the head in relation to the first end surface.

3. Pin according to claim 1, wherein the breakneck groove has a first lip and a second lip tangential to the arc of circle portion and substantially tapered, said first and second lips being respectively arranged on the head and on the handling component.

4. Pin according to claim 3, in which:
   the first lip forms a first angle (α) with the end surface of the head, and a second angle (β) with the second lip,
   the first angle (α) is between 5° and 25° and preferably between 10° and 15°; and
   the second angle (β) is between 15° and 60°, preferably between 25° and 35° and more preferably close to 30°.

5. Pin according to claim 1, wherein the head is a countersunk head.

6. A fastener comprising:
   a pin as claimed in claim 1; and
   a sleeve comprising a collar and a cylindrical body, adjacent to the main axis;
   the sleeve body comprising: a deformation zone capable of forming an outer bulb; and a threaded portion able to cooperate with the threaded portion of the pin.

7. Fastener according to claim 6 wherein the head is a countersunk head, wherein the sleeve collar is tapered and able to house the countersunk pin head,
   an end of that collar, opposite the sleeve body, being substantially set in a third plane perpendicular to the main axis.

8. An assembly comprising:
at least one structure comprising a first surface and a second surface opposite, a hole opening on each of those surfaces; and
a fastener according to claim 6,
in which:
the collar of the sleeve is in contact with the head of the pin and butts up the end of the hole in the structure,
the deformation zone of the sleeve body is in an installed configuration, in the form of an outer bulb in contact with the second surface of the structure; and
the head and the handling component of the pin are separated, said head having a fracture surface that is substantially coplanar with the end surface of the pin and end of the sleeve collar.

9. Assembly according to claim 8, wherein the arc of circle portion of the breakneck groove comprises a first part and a second part arranged on the first plane on either side of the head and handling component respectively, said first part forming a cavity in the head in relation to the first end surface, and wherein the fracture surface is bordered by the first portion of the arc of circle portion of the breakneck groove.

10. A method for fitting a fastener according to claim 6 in a structure comprising a first surface and a second surface opposite and a hole opening on each of those surfaces, said method comprising the following successive steps:
assembly of the threaded portion of the pin with the threaded portion of the sleeve, the deformation zone of the body of that sleeve being in an initial cylindrical configuration;
inserting the sleeve in the hole of the structure, on the first surface;
maintaining the collar in contact with the first surface;
pulling or torquing the pin into the sleeve until an outer bulb is formed in contact with the second surface; and
torquing the handling component in relation to the head of the pin around the main axis until fracture of the breakneck groove and formation of the fracture surface on the head.

11. A pin extends along a main axis and comprising a head and a threaded portion, an end of the head opposite to the threaded portion forming an end surface in a first plane perpendicular to the main axis,
the pin further comprises a handling component which is an integral part of the head opposite the threaded portion, a junction between that head and the handling component comprising a breakneck groove configured to break under a torsional stress greater than a predetermined threshold, said breakneck groove having substantially a shape of revolution around the main axis,
characterized in that, in a second plane comprising the main axis, a section of the breakneck groove has an arc of circle portion, a center of said circle being substantially set in the first plane, wherein the arc of circle portion comprises a first part and a second part arranged on the first plane on either side of the head and handling component respectively, said first part forming a cavity in the head in relation to the first end surface.

12. A pin extends along a main axis and comprising a head and a threaded portion, an end of the head opposite to the threaded portion forming an end surface in a first plane perpendicular to the main axis,
the pin further comprises a handling component which is an integral part of the head opposite the threaded portion, a junction between that head and the handling component comprising a breakneck groove configured to break under a torsional stress greater than a predetermined threshold, said breakneck groove having substantially a shape of revolution around the main axis,
characterized in that, in a second plane comprising the main axis, a section of the breakneck groove has an arc of circle portion, wherein the breakneck groove has a first lip and a second lip tangential to the arc of circle portion and substantially tapered, said first and second lips being respectively arranged on the head and on the handling component whereby the first lip has at least a portion on a side of the first plane opposite the second lip.

* * * * *